US012147198B2

(12) United States Patent
Matthey et al.

(10) Patent No.: US 12,147,198 B2
(45) Date of Patent: Nov. 19, 2024

(54) TIMEPIECE COMPRISING A GENERATOR AND METHOD FOR ASSEMBLING SUCH A GENERATOR

(71) Applicant: The Swatch Group Research and Development Ltd, Marin (CH)

(72) Inventors: Olivier Matthey, Mauborget (CH); Jean-Jacques Born, Morges (CH)

(73) Assignee: The Swatch Group Research and Development Ltd, Marin (CH)

( * ) Notice: Subject to any disclaimer, the term of this patent is extended or adjusted under 35 U.S.C. 154(b) by 572 days.

(21) Appl. No.: 17/376,385

(22) Filed: Jul. 15, 2021

(65) Prior Publication Data

US 2022/0066394 A1 Mar. 3, 2022

(30) Foreign Application Priority Data

Sep. 3, 2020 (EP) .................................... 20194269

(51) Int. Cl.
*G04C 10/00* (2006.01)
*G04C 3/00* (2006.01)
*H02K 7/18* (2006.01)

(52) U.S. Cl.
CPC ............. *G04C 10/00* (2013.01); *G04C 3/008* (2013.01); *H02K 7/1807* (2013.01)

(58) Field of Classification Search
CPC ........ G04C 10/00; G04C 3/008; G04G 17/04; H02K 7/1807
See application file for complete search history.

(56) References Cited

U.S. PATENT DOCUMENTS 3,922,845 A 12/1975 Miyasaka et al.
6,124,649 A 9/2000 Schafroth
(Continued)

FOREIGN PATENT DOCUMENTS

CH 705 231 A2 1/2013
CN 1178587 A 4/1998
(Continued)

OTHER PUBLICATIONS

Definition of "Articulation," Oxford University Press (Year: 2024).*
(Continued)

*Primary Examiner* — Renee S Luebke
*Assistant Examiner* — Matthew Hwang
(74) *Attorney, Agent, or Firm* — Oblon, McClelland, Maier & Neustadt, L.L.P.

(57) ABSTRACT

A timepiece and method for mounting a generator in the timepiece, this generator being formed of a rotor with permanent magnets and two coils. A supporting structure is preassembled with the rotor and an electronic module including the two coils is preformed. The method includes the following successive steps for laterally mounting the electronic module in the supporting structure so as to form the generator; assembly of an electronic module support with the supporting structure to form an articulation; rotation of the electronic module thanks to the articulation to bring the two coils closer to the axis of rotation of the rotor, so that these two coils are finally each located in a functional position at the same distance from the axis of rotation of the rotor; fastening of the electronic module to block the articulation after said rotation and thus maintain this electronic module in a functional angular position.

8 Claims, 5 Drawing Sheets

(56) References Cited

U.S. PATENT DOCUMENTS

| | | |
|---|---|---|
| 6,381,198 B1 | 4/2002 | Born |
| 2016/0134172 A1 | 5/2016 | Xiao et al. |

FOREIGN PATENT DOCUMENTS

| | | |
|---|---|---|
| CN | 1299177 A | 6/2001 |
| CN | 102929121 A | 2/2013 |
| CN | 111293935 A | 6/2020 |
| EP | 1 109 083 A1 | 6/2001 |
| EP | 1 772 791 A1 | 4/2007 |
| GB | 1 429 100 A | 3/1976 |
| JP | 2001-186731 A | 7/2001 |
| WO | WO 2015/014288 A1 | 2/2015 |

OTHER PUBLICATIONS

Definition of "Preformed," Oxford University Press (Year: 2024).*
Combined Chinese Office Action and Search Report issued Nov. 8, 2022 in Patent Application No. 202111011035.1 (with English translation of Category of Cited Documents), 7 pages.
European Search Report issued Jan. 25, 2021 in European Application 20194269.5, filed on Sep. 3, 2020 (with English Translation of Categories of cited documents), 3 pages.

* cited by examiner

US 12,147,198 B2

TIMEPIECE COMPRISING A GENERATOR AND METHOD FOR ASSEMBLING SUCH A GENERATOR

CROSS-REFERENCE TO RELATED APPLICATION

This application claims priority to European Patent Application No. 20194269.5 filed on Sep. 3, 2020, the entire disclosure of which is hereby incorporated herein by reference.

TECHNICAL FIELD OF THE INVENTION

The invention relates to the field of timepieces which comprise an electricity generator, also called a micro-generator, formed of a rotor with permanent magnets and a stator provided with coils connected to an electronic circuit so as to be able to power supply said stator.

In particular, the invention relates to electromechanical horological movements incorporating a generator, the rotor of which is in meshing relation with a geartrain arranged between a barrel, forming a mechanical energy source, and an analogue display of the current time.

TECHNOLOGICAL BACKGROUND

A horological movement of the type defined above is described in document EP 1 109 083. This horological movement is provided with a generator which generates electricity to power supply a circuit for regulating the speed of rotation of the rotor of this generator. As this rotor meshes with the geartrain of the horological movement, the forward movement of the analogue display indicators is thus controlled. The rotor of the generator comprises a pinion on its shaft which meshes with a mobile of the geartrain. This rotor is mounted in a supporting structure of the horological movement in the same way as another mobile of the geartrain, namely between a plate and a bridge, and it comprises two flanges, carrying magnets, between which are partially located the coils of the stator. Therefore, when the rotor is first mounted in the supporting structure with the other mobiles of the geartrain, it is then necessary to introduce the coils laterally into the watch supporting structure, that is to say perpendicularly to the axis of rotation/central shaft of the rotor.

As indicated in the above-mentioned document, it is important that the generator can provide a rectified voltage having, for the intended rotor, the greatest possible value. To this end, it is advantageous that the coils can be placed at best between the magnets in order to obtain the greatest possible induced voltage in the coils. This is achieved by selecting, according to the radial position of the rotor magnets, the largest possible useful diameter for the coils. To achieve this, it is generally necessary for each of the coils to be able to penetrate between the rotor flanges as close as possible to the central rotor shaft. Thus, it is therefore advantageous that all the coils are located at the same distance from the axis of rotation of the rotor, so that each of them provides an induced voltage of substantially the same intensity. It will be noted that watch generators generally have two or three coils for six bipolar magnets, with axial magnetisation and alternating polarity, arranged circularly and regularly on each of the two flanges, the coils having therebetween an angle at the centre of 120°. This configuration has proved to be optimal for the dimensions of watch generators so as to obtain a relatively large induced voltage in the coils while allowing, in the case of a two-coil stator, a favourable arrangement of the stator in the horological movement. A rotor with four or eight magnets per flange requires coils angularly offset by 90° or 180°. Two coils offset by 90° are severely limited in the useful diameter that they can have and an offset of 180° therebetween complicates the arrangement of the stator in the horological movement and generally poses a larger problem of bulk.

Document EP 1 109 083 proposes, with reference to FIGS. 3 and 4, a stator with three coils forming a separate module, which is mounted like a drawer in a space of the supporting structure defining a slide for this separate module. As a rule, the separate module also supports the electronic regulating circuit; it will therefore be referred to hereinafter as an "electronic module". Thus, to assemble the stator with the rotor, the latter being mounted beforehand in the supporting structure of the horological movement when assembling the geartrain with this supporting structure, the electronic module is introduced into the slide and slid in this slide until the coils are in place around the rotor shaft and partially between the two rotor flanges. The proposed technique therefore consists in sliding laterally in a slide, along a linear axis defined by the slide, the electronic module in the supporting structure. This technique has several disadvantages. First, the arrangement of the movement is conditioned by the fact that the sliding axis must be median between two coils. Then, since two coils are introduced beyond the rotor shaft, there must be a spacing between these two coils at least equal to the diameter of the rotor shaft.

There are still other disadvantages to be noted. If one of the three coils is eliminated to reduce the bulk and if one wishes to maximise the voltage induced in the two remaining coils by allowing their periphery to be at a small distance from the shaft (minimum functional distance given the manufacturing tolerances), a relatively large lateral clearance must be provided in the slide to allow the coil, the centre of which is at the rear of the rotor shaft, to bypass the rotor shaft. Such lateral clearance partly removes the interest of the slide and it creates a problem for fastening the electronic module as provided, that is to say by means of screws, because it is then difficult to properly align the holes provided in a support of the electronic module for the passage of the screws and the respective threaded holes provided in the plate. It will be noted that fastening the electronic module by screws, the heads of which are provided on the side of the upper bridge of the supporting structure, requires this upper bridge to have openings for this purpose or an external profile which does not cover the provided fastening areas. Thus, the electronic module support is partially visible from the side of this upper bridge, which can be a disadvantage for a mechanical type horological movement that can be shown through a glass back of the watch case incorporating this movement. Finally, the arrangement of a slide in the supporting structure requires a plate having in the slide a flat surface having a sufficient extent to properly guide the electronic module when mounted. For the coils to be properly centred between the two flanges, the rotor must have a precise axial positioning relative to such a flat surface.

SUMMARY OF THE INVENTION

The object of the invention is to overcome at least some of the disadvantages of the timepiece incorporating a generator according to the prior art described above, by providing a timepiece incorporating a generator and arranged so as to allow mounting an electronic module, comprising the coils of the generator, in a supporting structure, which is preassembled with the rotor of this generator, which is easy, efficient and precise. The invention also provides a method for mounting a generator in a timepiece.

The invention thus relates to a timepiece comprising a supporting structure and a generator formed of a rotor, provided with at least one magnet and mounted to pivot in the supporting structure, and of a stator composed of two coils and forming, with an electronic circuit, an electronic module which is arranged so as to be able to be mounted in the supporting structure after mounting the supporting structure with the rotor pivoted therein. The electronic module comprises a support having a first part forming an articulation with a first element of the supporting structure. The timepiece is arranged so that, during a lateral mounting of the electronic module preformed in the supporting structure preassembled with the rotor, said first part and said first element can be assembled to form the articulation, which then allows a rotation of the electronic module, around an axis of rotation defined by this articulation and parallel to an axis of rotation of the rotor, from a first angular position, wherein this electronic module is located directly after forming the articulation, to a second angular position to bring at least one of the two coils closer to the axis of rotation of the rotor, so that these two coils are finally each located in a functional position substantially at the same distance from the axis of rotation of the rotor, the electronic module being held in the second angular position by a fastening system which is arranged to be able to block the articulation in this second angular position.

According to a general embodiment of the invention, the first part of the support and the first element of the supporting structure are arranged so that this first part or/and this first element can undergo an elastic deformation allowing them to be assembled, in a removable manner, to form the articulation by laterally introducing, by pressure, the first element into the first part or the first part into the first element.

According to an advantageous variant, the fastening system is formed by a second part of the support and a second element of the supporting structure which are arranged to be able to be assembled by a pressure applied to the electronic module during a rotation of this electronic module, around the axis of rotation defined by the articulation and in the direction of said second angular position, occurring during the lateral mounting of the electronic module in the supporting structure, the second part and the second element being arranged so that this second part or/and this second element can undergo an elastic deformation allowing them to be assembled, in a removable manner, by introducing, by pressure, the second element into the second part or the second part into the second element.

A method for mounting a generator in a timepiece according to the invention is defined in the appended claims.

BRIEF DESCRIPTION OF THE FIGURES

The invention will be described in detail below using the appended drawings, given by way of non-limiting examples, wherein.

DETAILED DESCRIPTION OF THE INVENTION

With reference to the appended figures, a horological movement according to a main embodiment of the invention and a method for assembling its regulating system including a generator with permanent magnets, more particularly a method for mounting this generator will be described hereinafter.

Figure 1:
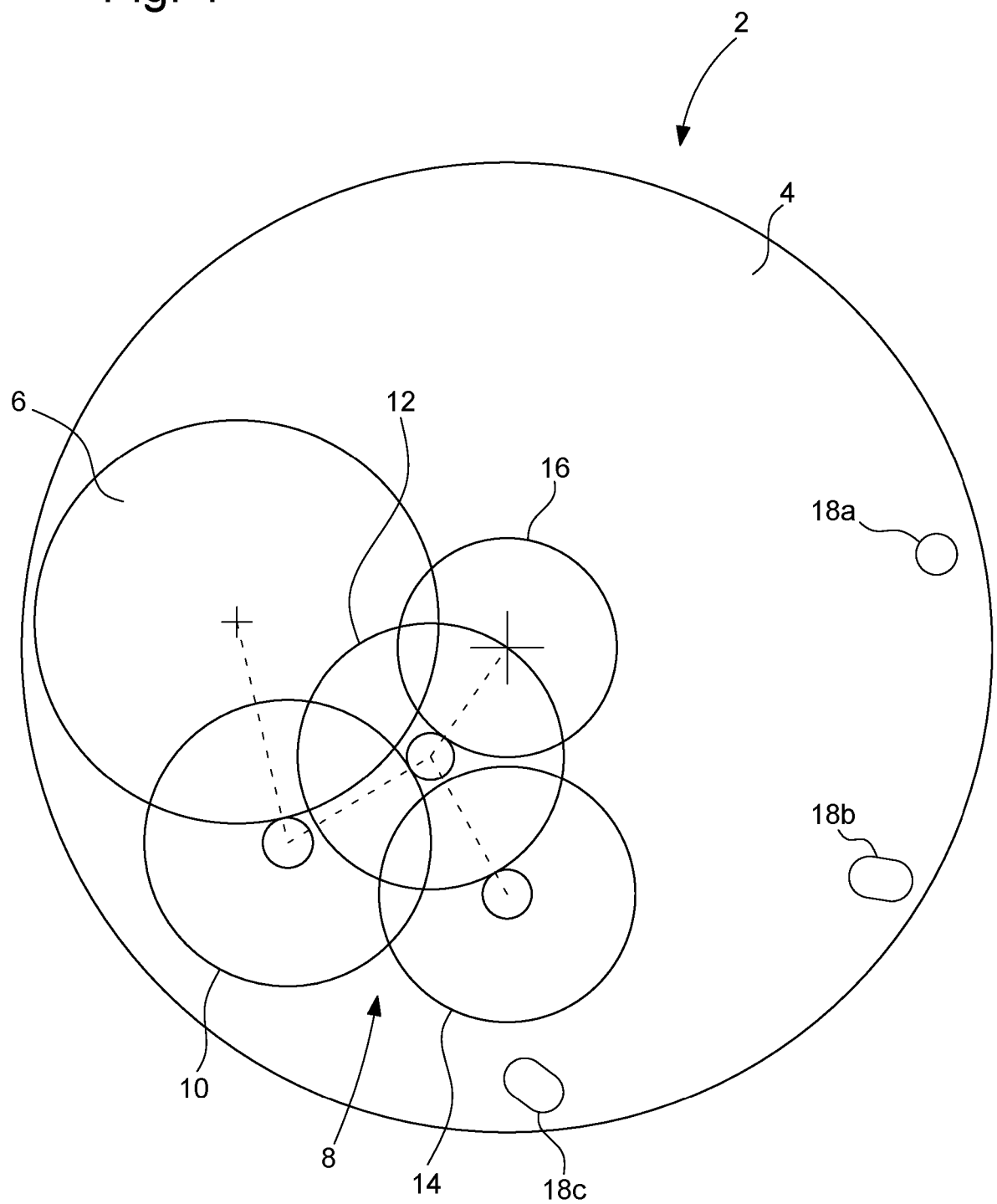
FIG. 1 schematically and partly shows a horological movement according to a main embodiment of the invention.

FIG. 1 schematically and partially shows a horological movement 2 which is characterised by a conventional mechanical energy source formed by a barrel 6 mounted on a plate 4, by an analogue display (not shown) which is driven by a geartrain 8 which is in turn driven by the barrel, and by a regulating system, formed by a generator and an electronic circuit for regulating its speed of rotation, which will be described later. In the example shown, the geartrain 8 comprises a large average mobile 10, an average mobile 12 whose pinion meshes with a central minute wheel 16 and whose wheel meshes with a second mobile 14 which can carry a small seconds hand positioned at '6 o'clock'. Conventionally, the central minute wheel 16 drives via a friction coupling (to allow time setting) a timer carrying a minute hand and an hour hand.

Figure 2:
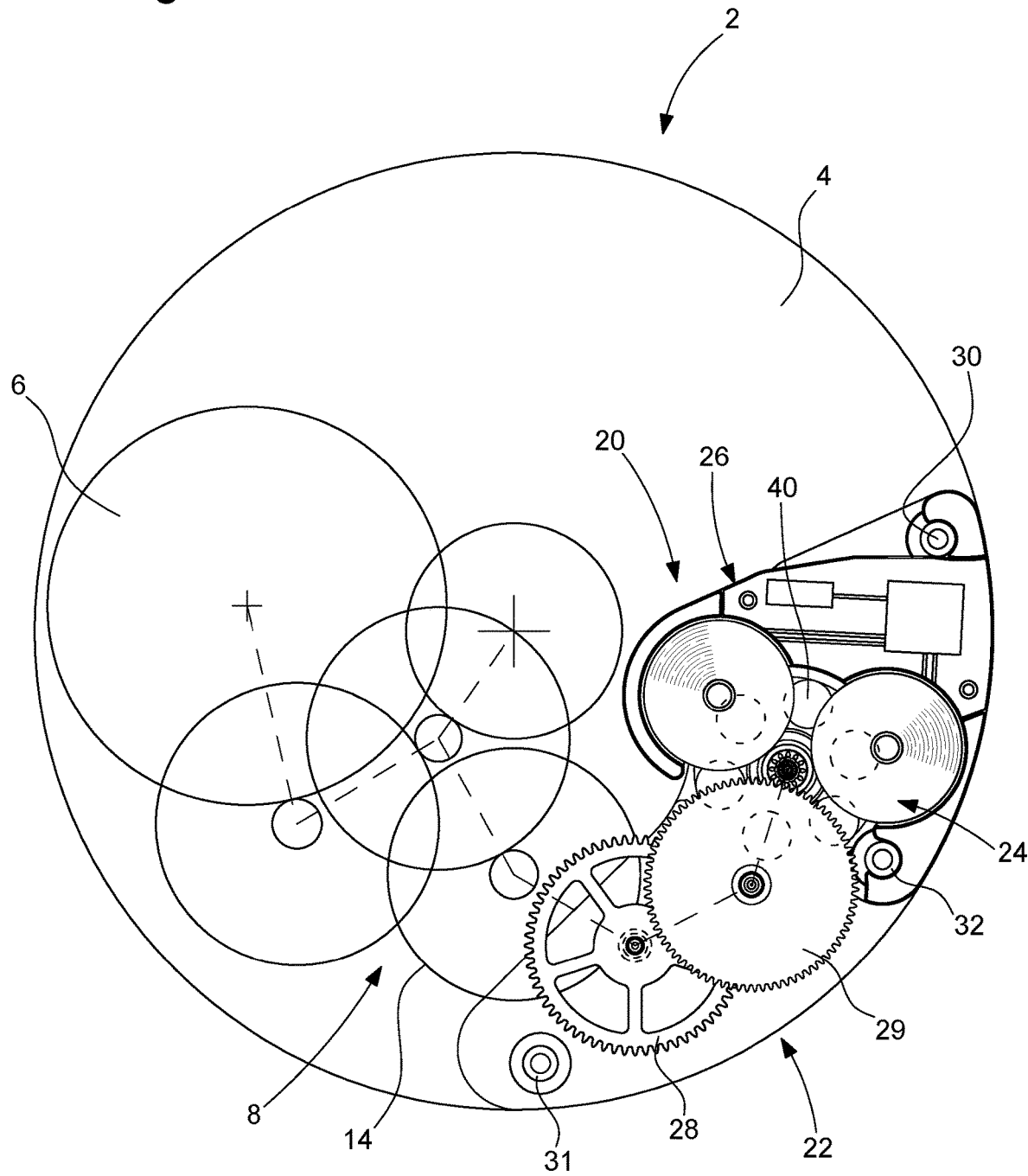
FIG. 2 shows, partially schematically, a section through the horological movement according to the main embodiment of the invention.
Figure 3:
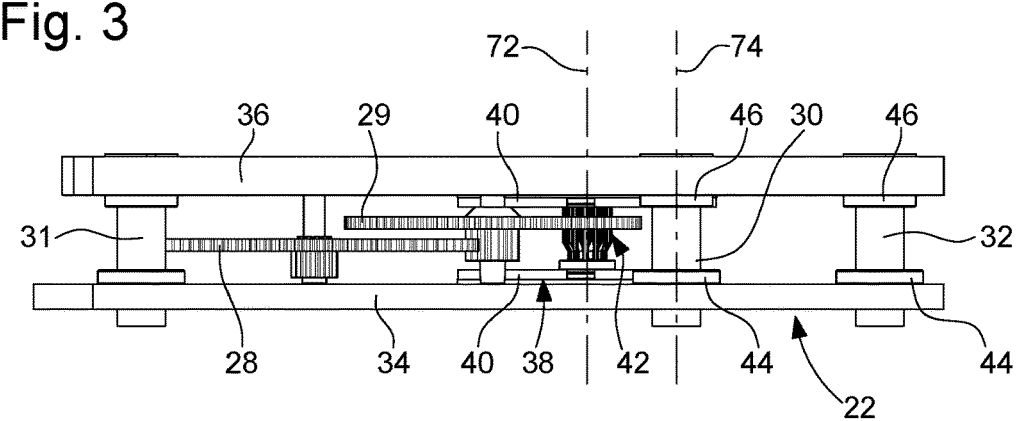
FIG. 3 is a side view of a supporting structure of a regulating module of the horological movement of FIG. 2.
Figure 4:
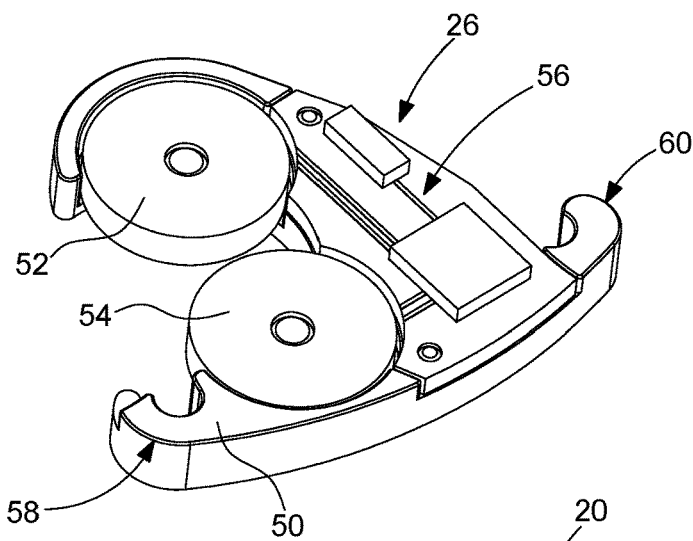
FIG. 4 is a perspective view of an electronic module partly forming the regulating module.
Figure 5:
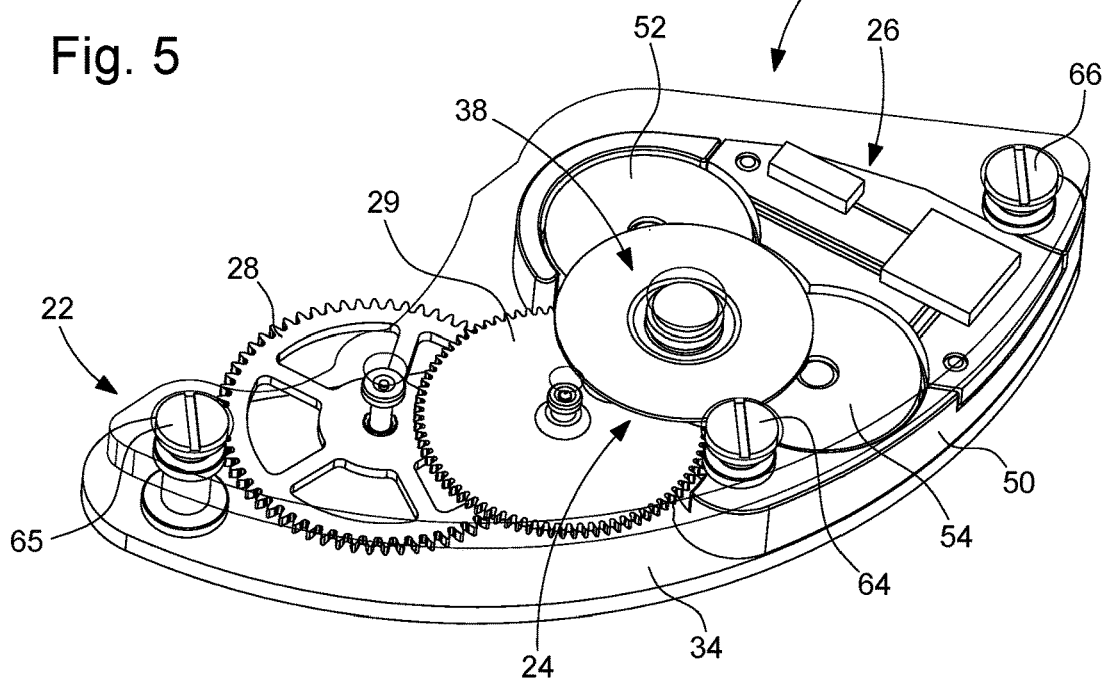
FIG. 5 is a perspective view of the regulating module with the upper bridge shown in transparency.

FIG. 2 shows the horological movement 2 with a regulating system which is formed by a regulating module 20 mounted on the plate 4 and fastened thereto by three screws (not shown) which are screwed from below the plate in the threaded holes of three pillars 30, 31 and 32 of a supporting structure 22 forming the regulating module. It will be noted that the threads may be at the pillars and/or the lower tubes which extend these pillars by passing through respective holes of a plate 34, wherein they are driven-in (alternatively glued or welded, optionally after driving-in), and by penetrating into respective holes 18a, 18b and 18c of the plate (see FIG. 1). Other means for fastening the regulating module to the plate may be provided, in particular fastening by driving-in, by gluing or by welding. Note that the variant shown and described provides for the regulating system to be in the form of a module which can be fully assembled before being mounted on the plate of the horological movement. This is an advantageous but non-limiting variant for the invention, as will emerge later from the description.

Referring to FIGS. 2 to 5, the regulating module 20 will be described in more detail which comprises: —a supporting structure 22, formed of a plate 34, three pillars 30, 31 and 32, and a bridge 36; a generator 24 which is formed by a rotor 38, mounted between the plate and the bridge wherein it is pivoted, and a stator comprising two identical coils 52 and 54; an electronic circuit 56 arranged on a support 50 and connected to the two coils which are carried on the support; —two mobiles 28 and 29 the pinion of the first one of which meshes with the wheel of the second mobile 14 and the wheel of the second one of which meshes with a pinion 42 of the rotor of the generator, allowing the rotor to perform several revolutions per second, for example about 64/9 revolutions/s. The rotor 38 has an axis of rotation 72. In order to be able to precisely regulate the penetration of the teeth of the wheel of the second mobile into the teeth of the pinion of the first mobile 28, the holes 18*b* and 18*c* in the plate 4 are provided to be oblong so that the regulating module 20 can be slightly rotated for this purpose around an axis of rotation defined by the lower tube extending the pillar 31 and inserted into the circular hole 18*a*.

According to the invention, the regulating module 20 comprises two distinct parts: —a mechanical part incorporating the rotor 38 of the generator 24, and—an electronic module 26 incorporating the two identical coils 52, 54 of this generator. These two different parts are arranged so that they can each be assembled, each in a preliminary step, before a final assembly of the electronic module 26 with the mechanical part of the regulating module, according to a method of the invention which will be described later, to completely form this regulating module. More generally, when the regulating system is not provided in the form of a module, the invention provides an electronic module, similar to the electronic module 26, which is distinct from the mechanical part of the horological movement incorporating the rotor 38 of the generator and which is arranged to be able to be mounted laterally in this mechanical part after assembly thereof in a preliminary step. Preferably, the electronic module can also be subsequently dissociated from the supporting structure without requiring dismounting the mechanical part. The electronic module 26, shown in perspective in FIG. 4, comprises a support 50 on which are arranged the two coils of the generator and the electronic circuit 56 for regulating the speed of rotation of this generator. The mechanical part of the regulating module comprises the supporting structure 22, the two mobiles 28, 29 and the rotor 38 of the generator which are pivotally mounted in the supporting structure to form the mechanical part before a final assembly of this mechanical part with the electronic module. The rotor 38 of the generator 24 comprises two discs each carrying magnets 40 on the side of an interior space defined by these two discs and into which penetrate the two coils 52 and 54 so that the magnets pass above and below the coils as the rotor rotates. It will be noted that in a variant of the generator, only one of the two discs is provided with permanent magnets.

The three pillars 30, 31 and 32, fixedly connecting the plate 34 to the bridge 36 while maintaining them at a certain distance from each other, each have at its two ends a lower shoulder 44 and an upper shoulder 46. The lower shoulder is used as a stop when mounting the pillars in the plate 34. In a variant, the lower shoulders of the pillars 30 and 32 also form a lower stop for the support 50 of the electronic module 26 and thus participate in the positioning in height of this electronic module. If this is not the case, then the support 50, once the electronic module has been assembled to the supporting structure, rests on the plate 34, the upper surface of which then defines a lower stop for the electronic module. The upper shoulders 46 of the three pillars are used as stops for the bridge 36 which is pressed against these stops by three screws 64, 65 and 66 used to fasten the bridge to the rest of the supporting structure. In a variant, the upper shoulders of the pillars 30 and 32 also form an upper stop for the support 50. Insofar as the distance between the lower shoulder and the upper shoulder corresponds to the height of the support 50, more particularly of its two fastening parts 58 and 60, these two shoulders allow to determine a precise axial position for the electronic module and more particularly for the two coils 52, 54, so that the latter are correctly centred between the magnets 40 of the rotor 38. Preferably, to maintain the coils in an axial position (along the axis of rotation of the rotor), a screw for fastening the support 50 to the plate 34 is provided in addition. In the variant shown where the support 50 rests on the plate 34, this additional fastening screw is used to press this support against the plate. In another variant where the axial position of the electronic module is determined by the lower and upper shoulders of the pillars 30 and 32, the additional fastening screw is screwed for example from the underside of the plate 4 through a machined non-threaded hole in this plate and an elastic spacer washer is arranged between the plate and the support, thus allowing to precisely regulate the distance between the plate and the support of the electronic module via this fastening screw.

Figure 6:
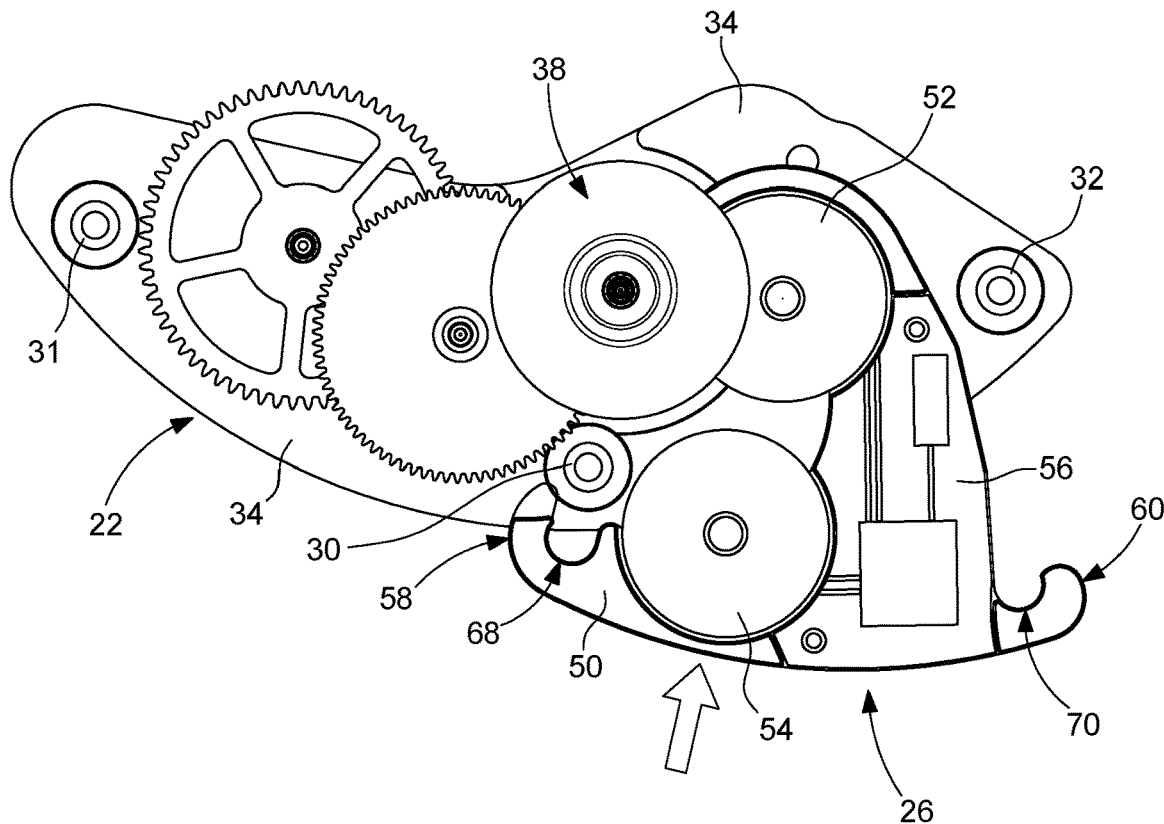
FIGS. 6 to 9 show four successive steps of assembling the electronic module in the supporting structure to form the regulating module.

Referring to FIGS. 6 to 9, an embodiment of the method for mounting a generator in a timepiece according to the invention will be described more precisely, this generator being formed of a rotor provided with at least one permanent magnet and two coils. In a first preliminary step, a mechanical part of a regulating module 20, already described, is preassembled with the rotor 38 of the generator 24 mounted in a supporting structure 22. In a second preliminary step, an electronic module 26, already described and comprising a support 50, the two coils and an electronic circuit 56, is preformed. The support 50 has a first part 58, on a first side of the support relative to a plane comprising the central axes of the two coils, which is configured so as to be able to form an articulation with a first element 30 of the supporting structure. In general, the method according to the invention comprises the following steps for laterally mounting the electronic module in the mechanical part of the regulating module, or of the horological movement, so as to form the generator:

Partial lateral introduction of the electronic module 26 into the supporting structure so that a part of the electronic module, remote from the first part, avoids a rotor shaft 38 by passing over the side of this shaft (FIG. 6);

Assembly of the first part 58 of the support and the first element 30 of the supporting structure to form the articulation (FIG. 7); then Rotation of the electronic module 26 (FIG. 8), around an axis of rotation 74 defined by the articulation and parallel to an axis of rotation 72 of the rotor, from a first angular position (FIG. 7), wherein this electronic module is located directly after forming the articulation, at a second angular position (FIG. 9) to bring at least one of the two coils closer to the axis of rotation of the rotor, so that these two coils are, in the second angular position, each located in a functional position substantially at the same distance from the axis of rotation 72 of the rotor;

Fastening of the electronic module 26 by a fastening system which is arranged to be able to block the articulation in the second angular position and thus maintain this electronic module in this second angular position.

Figure 7:
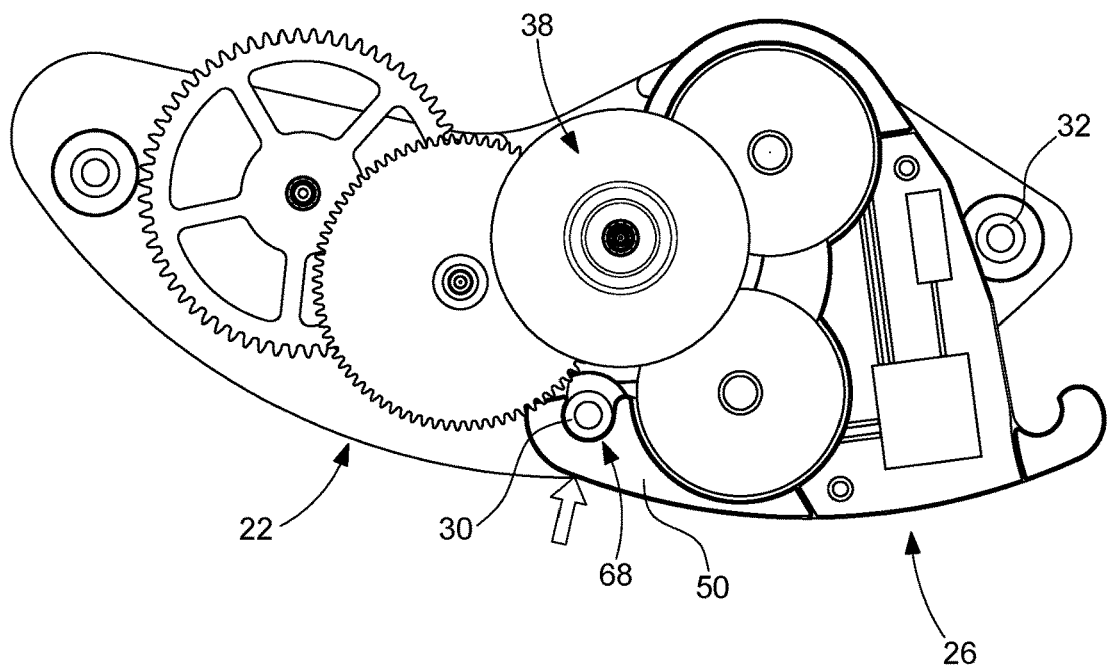
Figure 8:
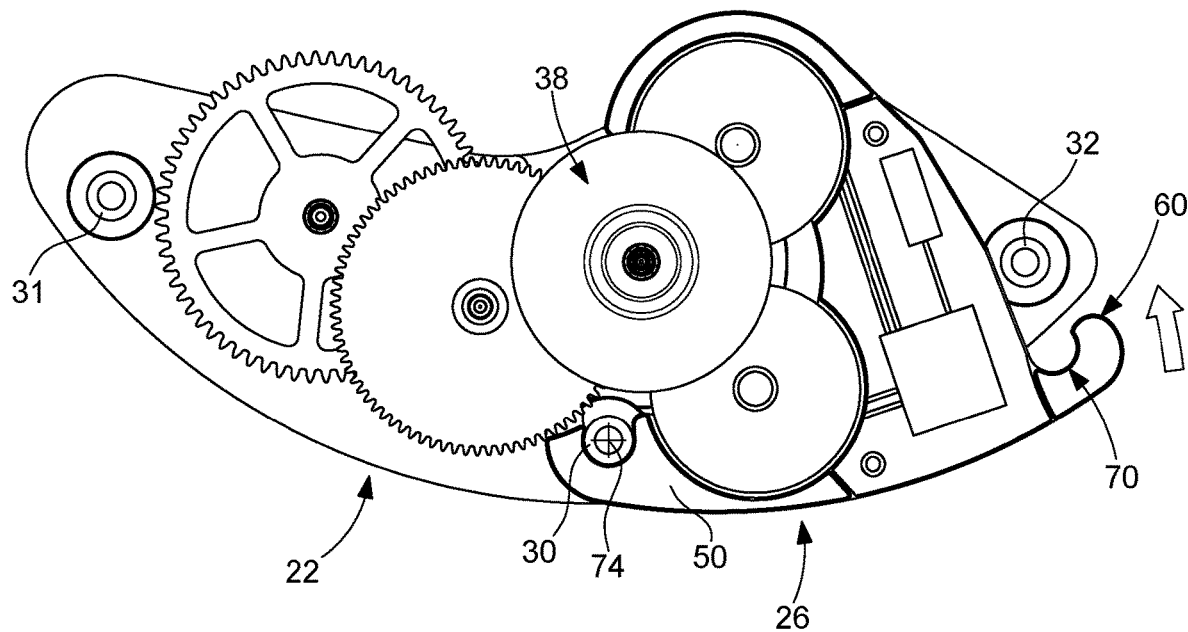

In the embodiment described using the figures, the assembly step is preceded by a step of laterally introducing the electronic module into the mechanical part of the regulating module, more specifically into the supporting structure 22 between the plate 34 and the bridge 36, by a linear or curvilinear movement (FIG. 6) allowing the first coil, having penetrated the supporting structure first, to avoid the rotor shaft, in particular the pinion 42 forming this shaft, by penetrating beyond this shaft into the mechanical part and allowing the first part 58 of the support to move closer to a first pillar 30 of the supporting structure so as to be able to finally be in contact with this first pillar and be assembled thereto to form an articulation (FIG. 7). The first pillar is cylindrical and the first part 58 has a circular cavity 68 whose cylindrical wall extends over more than 180°, this circular cavity being dimensioned to be able to receive the first pillar.

In the advantageous variant described, the first part 58 and the first pillar 30 are assembled by introducing the first pillar by pressure into the first part (FIG. 7), that is to say by opening the circular cavity by elastically enlarging this opening by pressure when introducing the first pillar into the circular cavity, so as to form the articulation. The first part 58 of the support therefore has an elastic deformation capacity allowing it to be assembled by pressure, in a removable manner, to the first pillar 30 to obtain an articulation whose axis of rotation 74 corresponds to the central axis of the first pillar 30. In another variant, an inversion in the configuration of the articulation is provided with a first part of the support of the electronic module defining a cylindrical part over more than 180° and a first element of the supporting structure having a circular cavity having a cylindrical wall extending over more than 180° and having an elastic deformation capacity which allows it to be assembled by pressure, in a removable manner, to the first part to obtain an articulation whose axis of rotation is defined by a central axis of the cavity.

Figure 9:
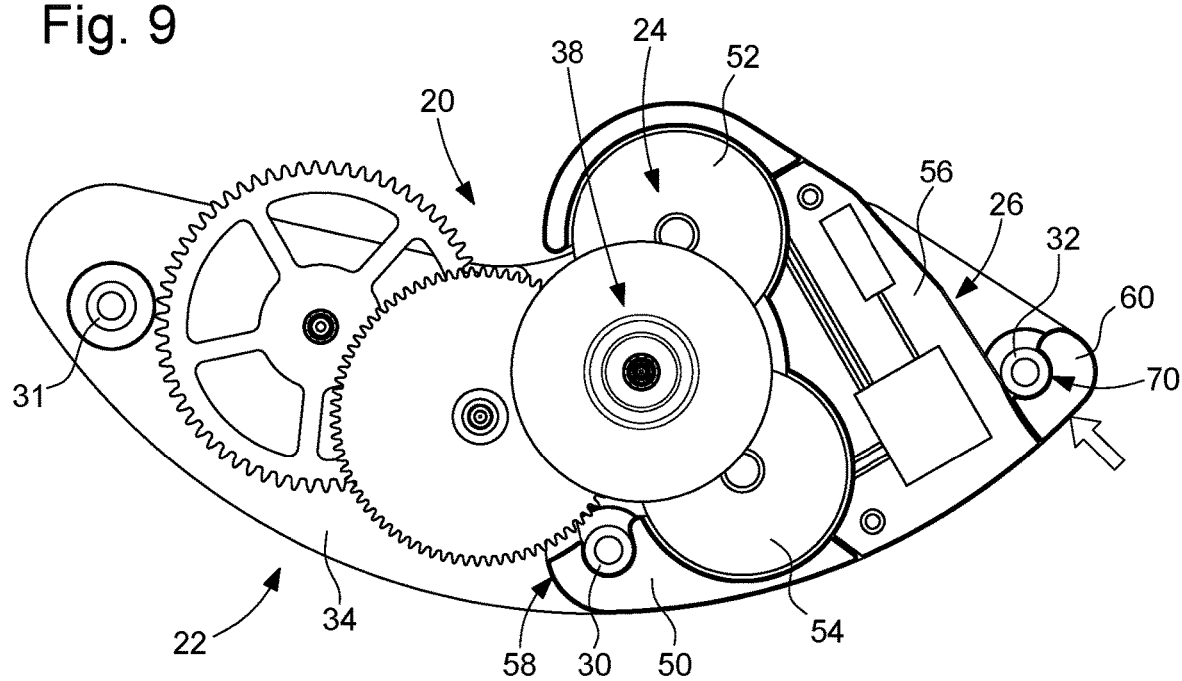

In the advantageous variant described, the fastening system, allowing to block the articulation in said second angular position at the end of a rotation of the electronic module (FIG. 8) carried out thanks to the articulation formed beforehand, is similar to the articulation formation system. This fastening system is formed by a second part 60 of the support 50, arranged on a second side of the support relative to the plane comprising the central axes of the two coils, and a second pillar 32 of the supporting structure which are assembled by a pressure applied to the electronic module during rotation of this electronic module, around the axis of rotation 74 defined by the articulation, in the direction of the second angular position (FIG. 9). The second part 60 and the second pillar 32 are arranged so that this second part can undergo an elastic deformation allowing them to be assembled, in a removable manner, by inserting the second pillar 32 by pressure into the second part 60 which defines a circular cavity the cylindrical wall of which extends over more than 180°. In another variant, an inversion is provided in the configuration of the fastening system with a second part of the support of the electronic module defining a cylindrical part over more than 180° and a second element of the supporting structure having a circular cavity having a cylindrical wall which extends over more than 180° and has an elastic deformation capacity allowing it to be assembled by pressure, in a removable manner, to the second part in order to block the articulation and maintain the electronic module in the second angular position. It will be noted that in an alternative, it is the cylindrical part which has an elastic deformation capacity, for example by making this cylindrical part with a slot, in a plane containing the central axis of this cylindrical part, over the major part of its diameter. It will be noted that, given that the fastening system is used to block the articulation and to fasten the electronic module in association with the articulation, it is not necessary for it to form an articulation so that it has no need to be formed of an at least partially cylindrical part and element.

In an advantageous variant, once the articulation has been formed and then blocked in the second angular position by the fastening system, a final axial position of the electronic module 26 is provided by an additional device for fastening this electronic module to the supporting structure, in particular by a fastening screw which can be screwed from the underside of the plate 34 in the support 50, as already explained previously, or alternatively from above the electronic module in the plate 34 or else from above the bridge 36 in the support.

The invention claimed is:

1. A timepiece comprising a supporting structure and a generator formed of a rotor, provided with at least one magnet and mounted to pivot in the supporting structure, and of a stator composed of two coils and forming, with an electronic circuit, an electronic module which is arranged so as to be able to be mounted in the supporting structure after mounting the supporting structure with the rotor pivoted therein; wherein the electronic module comprises a support for the two coils having a first part forming an articulation with a first element of the supporting structure, the first part and the first element being arranged so that said first part or/and said first element can undergo an elastic deformation allowing them to be assembled, in a removable manner, to form said articulation by laterally introducing, by pressure, the first part into the first element or the first element into the first part; and wherein the timepiece is arranged so that, during a lateral mounting of the electronic module in the supporting structure preassembled with the rotor, the first part and the first element can be assembled to form said articulation, which then allows a rotation of the electronic module, around an axis of rotation defined by said articulation and parallel to an axis of rotation of the rotor, from a first angular position, wherein said electronic module is located directly after forming the articulation, to a second angular position to bring at least one of the two coils closer to the axis of rotation of the rotor, so that these two coils are each located in a functional position substantially at the same distance from the axis of rotation of the rotor, the electronic module being held in the second angular position by a fastening system which is arranged to be able to block the articulation in said second angular position.

2. The timepiece according to claim 1, wherein said fastening system is formed by a second part of said support and a second element of said supporting structure which are arranged to be able to be assembled by a pressure applied to the electronic module during a rotation of said electronic module, around said axis of rotation defined by the articulation and in the direction of said second angular position, occurring during the lateral mounting of the electronic module in the supporting structure, said second part and said second element being arranged so that said second part or/and said second element can undergo an elastic deformation allowing them to be assembled, in a removable manner, by introducing, by pressure, the second element into the second part or the second part into the second element.

3. The timepiece according to claim 1, wherein said articulation or/and said fastening system is/are arranged so as to determine an axial position wherein the electronic module is positioned in height, once the articulation has been formed and then blocked in the second angular position by the fastening system.

4. The timepiece according to claim 1, wherein, once the articulation has been formed and then blocked in the second angular position by the fastening system, a final axial position of the two coils is provided by an additional fastening device designed to fasten the electronic module to the supporting structure.

5. A method for mounting a generator in a timepiece, said generator being formed of a rotor provided with at least one permanent magnet and two coils; wherein a supporting structure is preassembled with said rotor pivoted in said supporting structure and an electronic module comprising a support, the two coils being fixed to said support, and an electronic circuit is preformed; wherein the support has a first part which is configured so as to be able to form an articulation with a first element of the supporting structure; the method comprising the following for laterally mounting the electronic module in the supporting structure so as to form the generator:

partially laterally introducing the electronic module, support and two coils into the supporting structure so that a part of the electronic module, remote from the first part, avoids a rotor shaft by passing over a side of said shaft;

assembling the first part of the support and the first element of the supporting structure to form the articulation;

rotating the electronic module, support and the two coils around an axis of rotation defined by the articulation and parallel to an axis of rotation of the rotor, from a first angular position, wherein said electronic module is located directly after forming the articulation, to a second angular position to bring at least one of the two coils closer to the axis of rotation of the rotor, so that these two coils are, in the second position, each located in a functional position substantially at the same distance from the axis of rotation of the rotor; and fastening the electronic module by a fastening system which is arranged to be able to block the articulation in the second angular position and thus maintain said electronic module in said second angular position.

6. The method according to claim 5, wherein said first part and said first element are assembled by laterally introducing, by pressure, the first element into the first part or the first part into the first element so as to form said articulation, the first part or/and the first element having an elastic deformation capacity allowing them to be assembled by pressure in a removable manner.

7. The method according to claim 5, wherein the fastening system is formed by a second part of said support and a second element of said supporting structure which are assembled by a pressure applied to the electronic module during rotation of said electronic module, around said axis of rotation defined by the articulation, in the direction of said second angular position, the second part and the second element being arranged so that said second part or/and said second element can undergo an elastic deformation allowing them to be assembled, in a removable manner, by introducing, by pressure, the second element into the second part or the second part into the second element.

8. The method according to claim 5, wherein, once the articulation has been formed and then blocked in the second angular position by the fastening system, a final axial position of the electronic module is provided.

* * * * *